United States Patent [19]

Samit et al.

[11] Patent Number: 6,048,174
[45] Date of Patent: Apr. 11, 2000

[54] IMPACT RESISTANT HOLLOW AIRFOILS

[75] Inventors: Marc Samit, West Hartford; Douglas A. Welch, Portland; Paul W. Duesler, Manchester; Patrick D. Markham, Glastonbury; Allan R. Penda, Amston, all of Conn.

[73] Assignee: United Technologies Corporation, Hartford, Conn.

[21] Appl. No.: 08/927,680

[22] Filed: Sep. 10, 1997

[51] Int. Cl.[7] ............................. F04D 29/38; F01D 5/18
[52] U.S. Cl. ................... 416/233; 416/224; 416/232; 416/223 A; 416/229 A; 416/229 R; 416/230 A; 416/230 R; 416/241 R
[58] Field of Search .................... 416/233, 232, 416/223 A, 230 R, 230 A, 224, 229 R, 229 A, 241 R

[56] References Cited

U.S. PATENT DOCUMENTS

| 5,129,787 | 7/1992 | Violette et al. ................... 416/226 |
|---|---|---|
| 5,253,824 | 10/1993 | Halila et al. ....................... 244/123 |
| 5,297,937 | 3/1994 | Umetani et al. ................... 416/233 |
| 5,343,619 | 9/1994 | Lardellier .......................... 29/889.7 |
| 5,419,040 | 5/1995 | Weisse et al. ....................... 29/889 |
| 5,429,877 | 7/1995 | Eylon ................................. 428/586 |
| 5,439,354 | 8/1995 | Hansen et al. .................... 416/233 |
| 5,584,660 | 12/1996 | Carter et al. ...................... 416/233 |
| 5,785,498 | 7/1998 | Quinn et al. ...................... 416/224 |

FOREIGN PATENT DOCUMENTS

| 2147055A | 5/1985 | United Kingdom ............... 416/230 R |
|---|---|---|
| 2154287A | 9/1985 | United Kingdom ............... 416/229 R |
| 2167500A | 5/1986 | United Kingdom ............... 416/230 R |

*Primary Examiner*—Edward K. Look
*Assistant Examiner*—Matthew T. Shanley

[57] ABSTRACT

A hollow airfoil (34) for a gas turbine engine having a leading edge (50), a trailing edge (52), a pressure side (54), and a suction side (56) includes a solid region of enhanced chordal thickness (78), and buttresses (82, 84, 86, 88). The present invention airfoil is preferentially strengthened so as to reduce the risk of airfoil fracture due to impact of airfoil with successive airfoils during an airfoil loss condition.

8 Claims, 5 Drawing Sheets

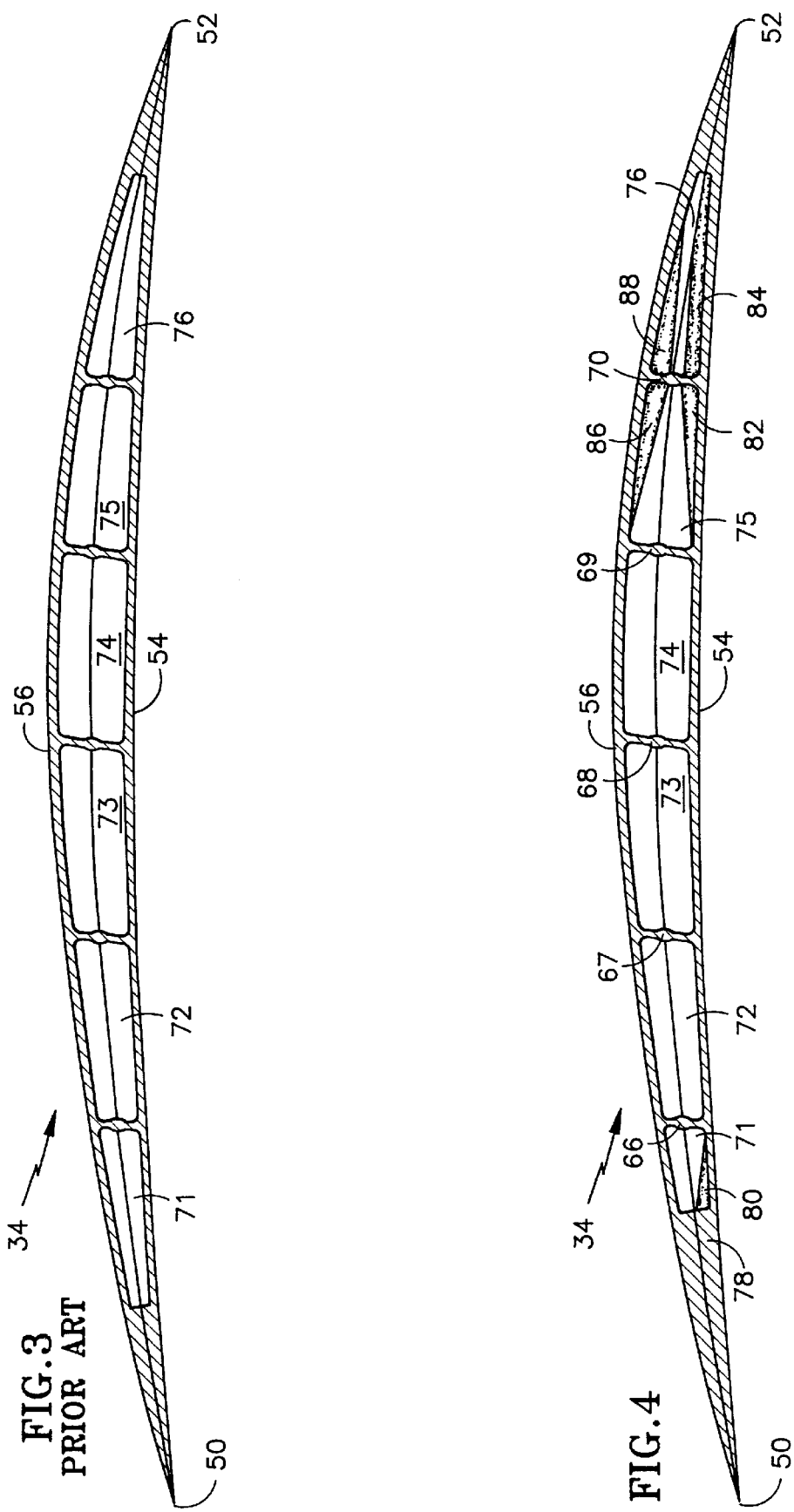

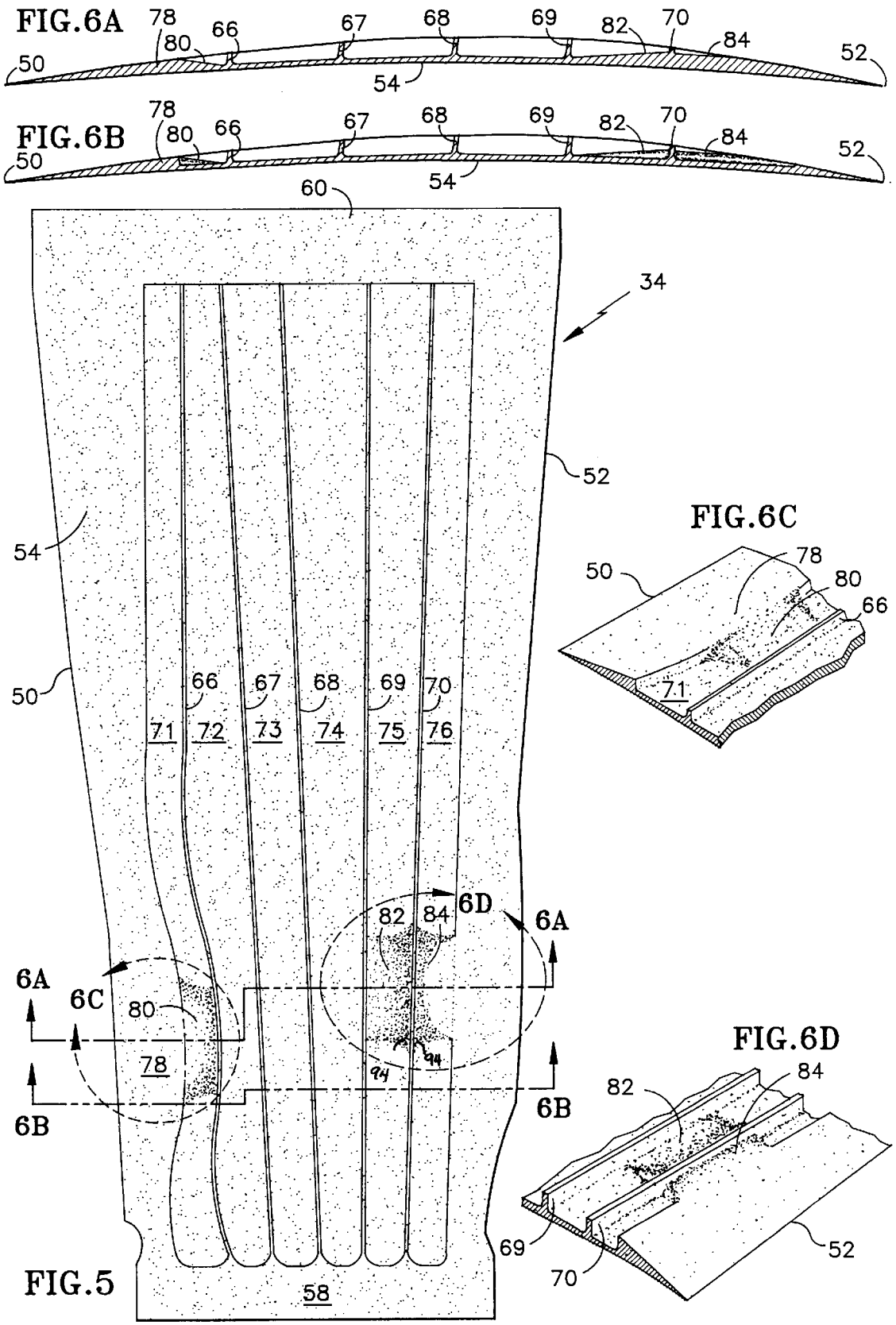

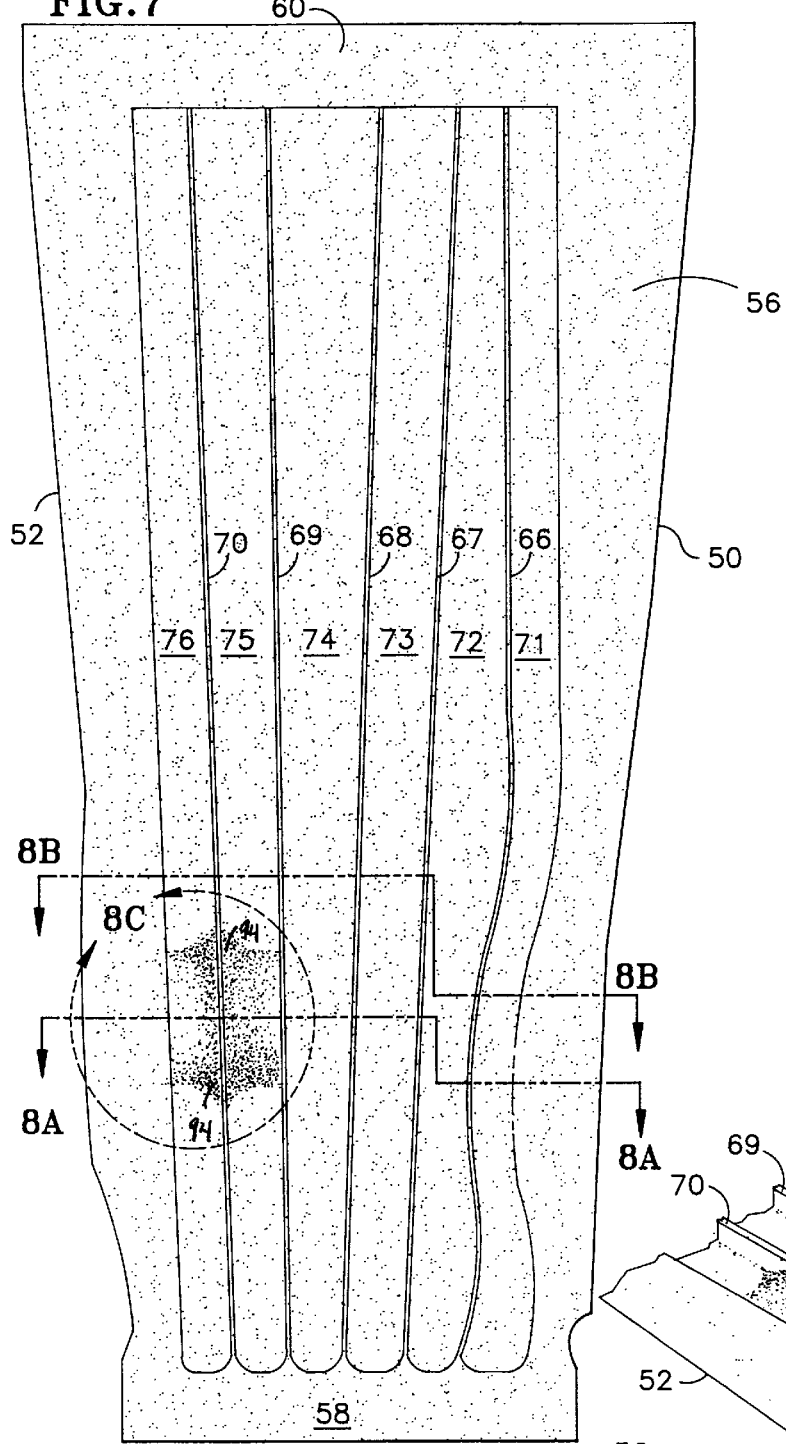
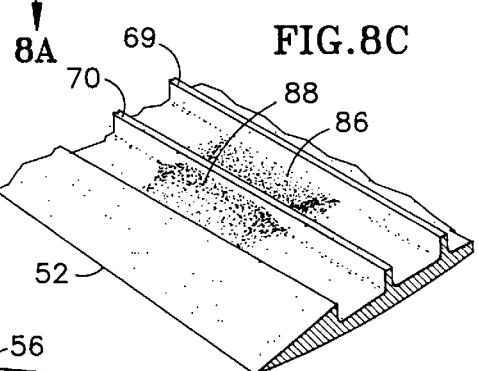
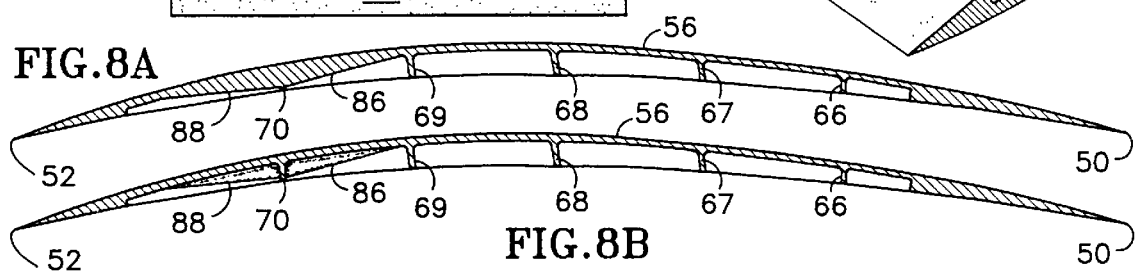

IMPACT RESISTANT HOLLOW AIRFOILS

TECHNICAL FIELD

The present invention relates to gas turbine engines, and more particularly, to hollow airfoils for a fan in the engine designed to reduce airfoil fracture during a blade loss condition.

BACKGROUND ART

During operation of a gas turbine engine, the fan thereof draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustor section, where fuel is added to the compressed air, and the air-fuel mixture is burned. The products of combustion are discharged to the turbine section. The turbine section extracts work from these products to power the fan and compressor. Any energy from the products of combustion not needed to drive the fan and compressor contributes to useful thrust.

One critical concern in the fabrication of gas turbine engines is the overall weight of the engine. Excessive weight in the components of the gas turbine engine limits the useful load the engine can power and reduces the flight range capability of the aircraft. Thus, it is a goal of the gas turbine engine industry to minimize the overall weight of the engine without sacrificing the performance or durability thereof.

It is this effort to minimize the overall weight of the gas turbine engine that has led the industry to the use of hollow fan blades. Each hollow fan blade typically includes two outer skins joined at both the leading and trailing edges and defining a hollow interior cavity therebetween. The hollow interior cavity has a plurality of internal spanwise and chordwise stiffening ribs disposed therein which further divide the interior into a plurality of hollow cavities.

Federal Aviation Administration (FAA) certification requirements for a bladed turbofan engine specify that the engine demonstrate the ability to survive failure of a single fan blade at a maximum permissible rotational speed, such failure being hereinafter referred to as the "blade loss condition." The certification tests require containment of all blade fragments and the safe shutdown of the engine. The ideal design criterion is to limit the damage caused by the single released blade, such that the released blade should not cause any other blade to fracture and be released. Impact loading on the containment casing and unbalanced loads transmitted to the engine structure are then at a minimum. If fan imbalance becomes too great, loss of the entire fan, engine or engine support structure can result.

The certification test method includes intentionally releasing a fan blade from the supporting hub by using both mechanical and explosive means. The released blade travels radially outward in the flow path with velocities of several hundred feet per second. Past experience has shown that when prior art hollow fan blades fracture at the outer portion of the dovetail attachment, the released blade will impact the leading edge of the adjacent blade following the released blade relative to the direction of rotation, hereinafter referred to as "following blade". The released blade may also impact the following blade at the trailing edge. As a result of the blade impacts, the following blade may fracture. These fractures will initiate at or in close proximity to the points of impact. The fractures may lead to the loss of a major portion of the following blade.

In addition, the loss of a major portion of the following blade leads to additional imbalance in the engine, which requires strengthening of the engine structure, including the containment system, the engine rotor and casing, the rotor bearing structures, the engine mounts and all the engine supporting structure including the wing and fuselage.

There are several possible solutions to the problem of severed fan blades due to the impact of a released blade with adjacent blades. One solution would be the addition of stronger platforms between the blades. The platforms can be mounted on the hub between the blades and as such, will not be an integral part of the blades. These platforms would offer resistance to the trajectory of the released blade as the released blade would be prevented from traveling through the space occupied by the added platform. Thus, the primary impact with the following blade would be absorbed by the stronger platform. As a result, the trajectory of the released blade would be altered such that the released blade would secondarily impact the following blade further outboard of the span of the following blade. The platform could delay the impact of the released blade upon the following blade and any possible fracture would also occur radially further outboard of the blade span. The resultant damage could thus be minimized as only a smaller portion of the following blade would be susceptible to loss. However, the addition of platforms between the hollow fan blades would have a significant impact on blade weight, fan performance and engine weight and thus be undesirable. Another possible solution would be to increase the thickness of the spanwise ribs and add chordwise ribs locally in the impact regions of the blade. These rib structures would make the blade more rigid against chordwise deformation. However, this structural reinforcement is less likely to prevent impact induced crack initiation, and may only have limited success in the prevention of subsequent crack propagation.

DISCLOSURE OF INVENTION

According to the present invention, a hollow fan blade is strengthened at predetermined locations corresponding to locations of impact of the blade with successive rotating blades, such that the hollow fan blade does not fracture when impacted with a released blade. The risk of damage to the following rotating hollow fan blade is reduced as the blade is strengthened by locally increasing certain regions of solidity in the leading edge and providing regional buttresses adjacent the trailing edge to provide load distribution during an impact of a blade with successive rotating blades.

The present invention has a region of increased solidity which is located adjacent the leading edge. This solid region of enhanced chordal thickness is located at a radial span where the impact with a released blade may occur. The strengthened region is able to withstand the impact with the released blade without the initiation of a crack.

Another characteristic of the present invention is a wall tapered in a chordwise direction between the solid region of enhanced chordal thickness and the first hollow cavity adjacent the leading edge. The taper decreases in thickness in the chordwise direction from the leading edge towards the trailing edge. This taper provides a gradual transition from the stiff solid region to the softer hollow cavity thus minimizing areas of stress concentrations in the airfoil. Cracking tends to occur primarily in areas of greatest stiffness discontinuity. By eliminating the high stress regions adjacent the impact region, the blade is not susceptible to crack initiation or propagation.

Another aspect of the present invention is a strengthened area comprising regional buttresses adjacent the trailing edge. In accordance with one particular embodiment of the invention, the regional buttresses extend around a spanwise rib in the trailing edge region and adjacent the trailing edge. These buttresses provide strengthening and support to local areas prone to impact with a released blade. The reinforcement provided by the buttresses helps to distribute impact loads and arrest any airfoil crack initiation or propagation.

A primary advantage of the present invention hollow fan blade is its enhanced durability. The characteristics of the hollow fan blade of the present invention minimize the risk of blade fracture of a following hollow fan blade when a released blade impacts the following blade. Another advantage of this blade impact resistance design is the ease and cost of manufacturing blades with the aforementioned features. The impact resistant design is manufactured using the same manufacturing procedures and tools used for prior art blades. Another advantage of the present invention is the decrease in the net weight of engine. The hollow fan blades themselves increase in weight due to the increased areas of solidity and buttresses. However, this increase in fan blade weight is more than offset by a decrease in the weight of associated engine structure needed for accommodation of engine imbalance loads. The present invention reduces the fan blade out loads throughout the engine by decreasing the release of blades during a blade loss condition. The loss of blades is responsible for imbalance loads at the rotor which get translated through the associated static engine structure. By limiting the blade loss to the single released blade, the present invention requires less strengthening of the static engine structure which has to withstand less imbalance loads. Thus, this engine supporting structure which includes the fan containment system, the engine rotor, rotor bearing structure, the engine mounts, the wing and fuselage can be decreased in weight.

The foregoing and other objects, features and advantages of the present invention will become more apparent in the light of the following detailed description of the best mode for carrying out the invention and from the accompanying drawings which illustrate an embodiment of the invention.

BRIEF DESCRIPTION OF THE DRAWINGS

FIG. 3 is a sectional view of a prior art blade.

FIG. 4 is a sectional view of the hollow fan blade of the present invention blade.

FIG. 5 is an elevation of the pressure side of a hollow fan blade viewed from the interior of the blade showing schematically the pressure side details according to the present invention.

FIG. 6A is a section of the pressure side of the blade taken along the lines 6A—6A of FIG. 5.

FIG. 6B is a section of the pressure side of the blade taken along the lines 6B—B of FIG. 5.

FIG. 6C is a broken perspective view of the leading edge region corresponding to the circled area 6C shown in FIG. 5.

FIG. 6D is a broken perspective view of the trailing edge region corresponding to the circled area 6D shown in FIG. 5.

FIG. 7 is an elevation of the suction side of a blade viewed from the interior of the blade showing schematically the suction side details according to the present invention.

FIG. 8A is a section of the suction side of the blade taken along lines 8A—8A of FIG. 7.

FIG. 8B is a section of the suction side of the blade taken along lines 8B—8B of FIG. 7.

FIG. 8C is a broken perspective view of the trailing edge region corresponding to the circled area 8C shown in FIG. 7.

BEST MODE FOR CARRYING OUT THE INVENTION

Figure 1:
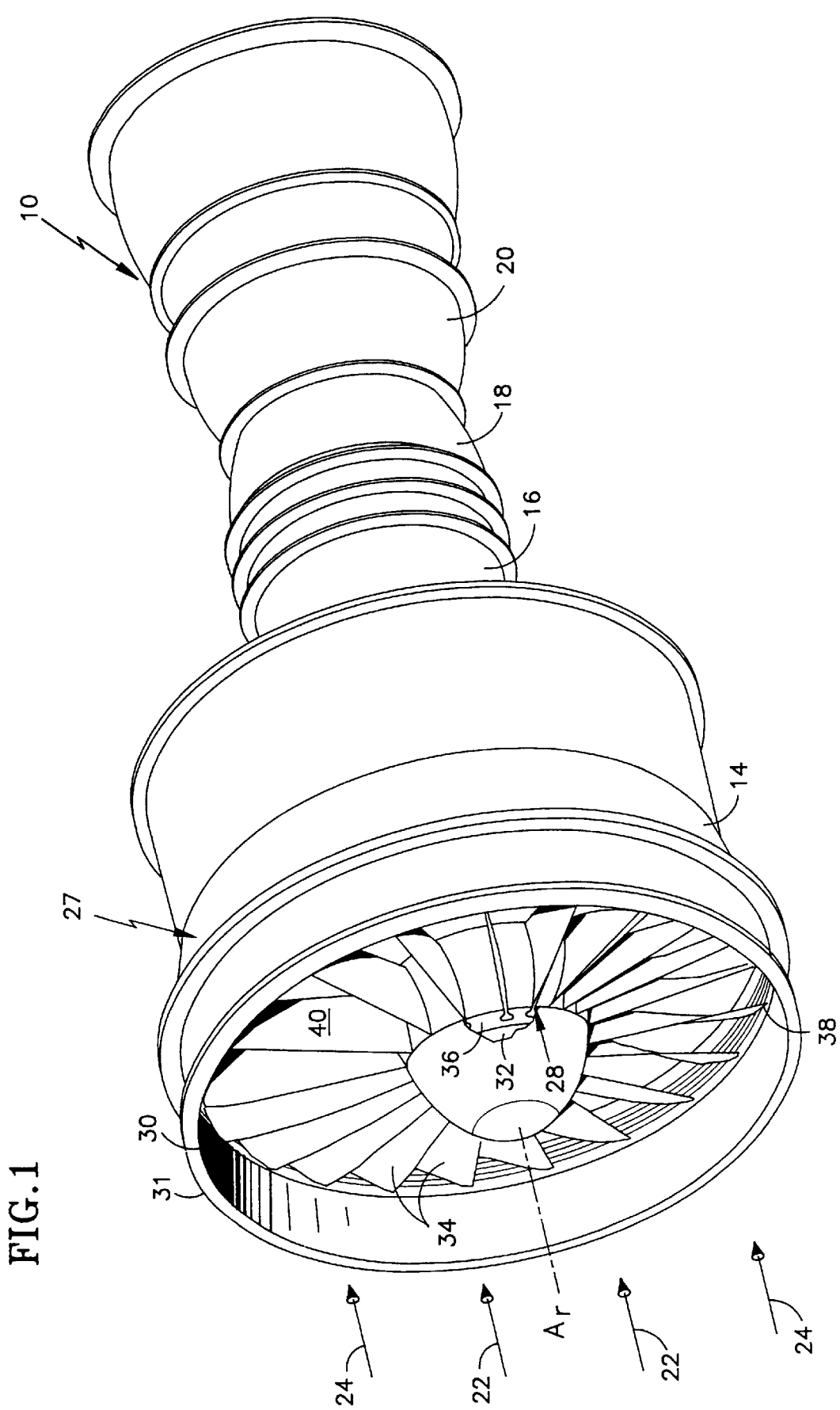
FIG. 1 is a perspective view of an axial flow, turbofan gas turbine engine.

Referring to FIG. 1, an axial flow, turbofan gas turbine engine 10 comprises of a fan section 14, a compressor section 16, a combustor section 18 and a turbine section 20 disposed along longitudinal axis $A_r$. A primary flow path 22 for working medium gases extends longitudinally along the axis $A_r$. The secondary flow path 24 for working medium gases extends parallel to and radially outward of the primary flow path 22.

The fan section 14 includes a stator assembly 27 and a rotor assembly 28. The stator assembly has a longitudinally extending fan case 30 which forms the outer wall of the secondary flow path 24. The fan case has an outer surface 31. The rotor assembly 28 includes a rotor disk 32 and a plurality of hollow blades 34. Each hollow blade 34 extends outwardly from the rotor disk 32 across the working medium flow paths 22 and 24 into proximity with the fan case 30. Each hollow blade 34 has a root portion 36, an opposed tip 38, and a midspan portion 40 extending therebetween.

Figure 2:
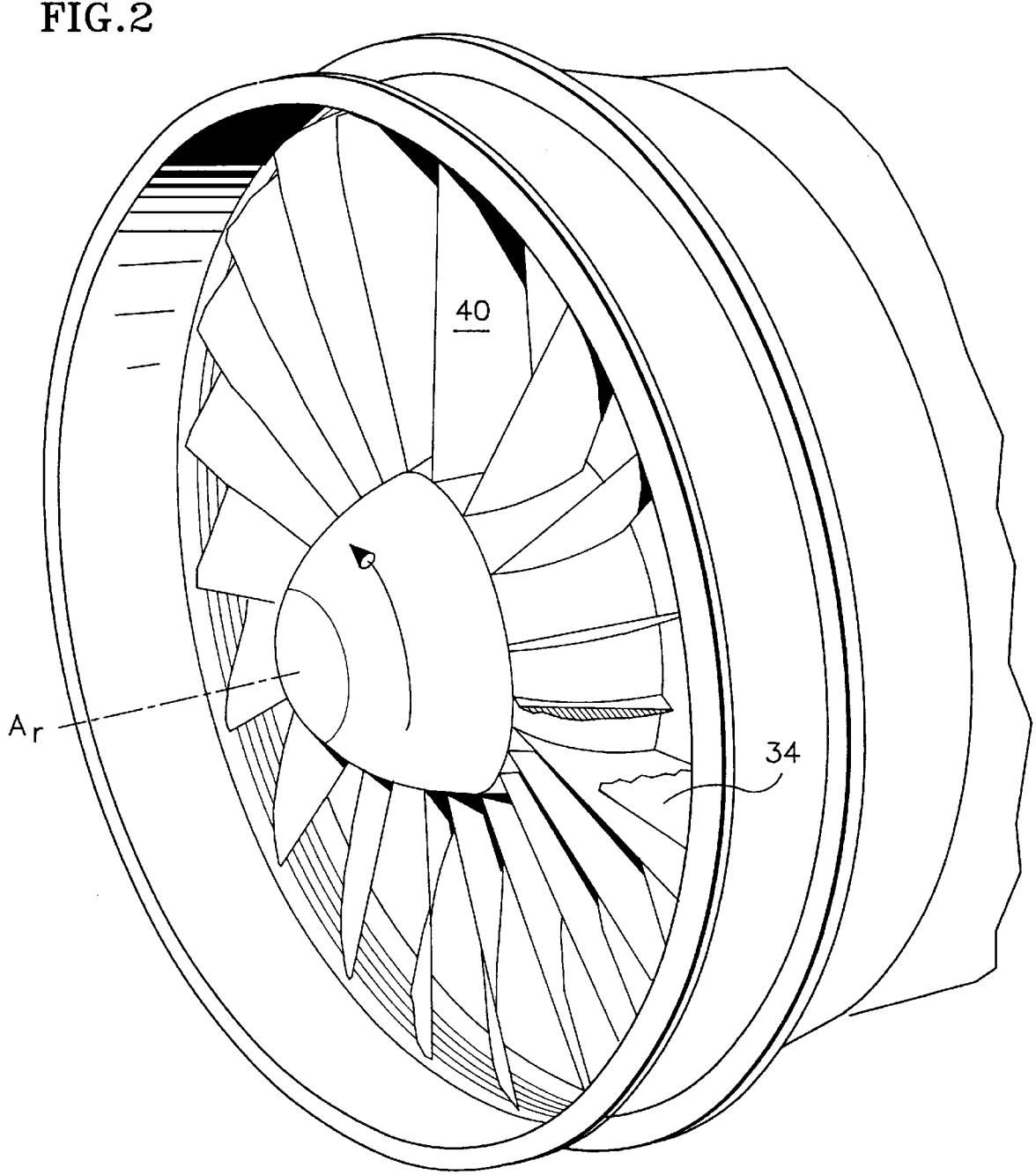
FIG. 2 is an enlarged perspective view of the fan section of the engine of FIG. 1 showing a view of a prior art blade fracturing in the fan.

FIG. 2 shows a blade of prior art fracturing in a fan in the axial flow gas turbine engine 10 shown in FIG. 1. The leading edge of the released blade impacts the following blade adjacent its leading edge. According to the present invention, it has been determined that this primary impact (not shown) occurs in a location approximately from fifteen percent (15%) to thirty-five percent (35%) of the radial span of the blade. A crack initiates usually in the following blade at this primary impact site. Due to loads imparted during the momentum exchange between the released blade and the following blade, the crack propagates along the boundary of a hollow cavity in the following blade. As the released blade moves centrifugally outward, most often, a secondary impact occurs between the released blade's trailing edge and the trailing edge of the following blade. This impact with the trailing edge of the following blade occurs about a half a millisecond (0.5 ms) after the primary impact between the leading edges. The secondary impact is located in a location approximately from twenty-four percent (24%) to thirty-six percent (36%) of the radial span of the blade. A crack (not shown) usually also initiates at the trailing edge impact site. The cracks propagate until a major portion of the blade is liberated.

Referring to FIG. 3, the hollow blade 34 of the prior art has a leading edge 50, a trailing edge 52, a pressure surface 54 and a suction surface 56. The hollow blade is adapted to extend across the flow paths 22, 24 for the working medium gases. The thin surfaces of the prior art blades are subject to damage by the impact of a released blade. The hollow airfoils are particularly susceptible to cracks because of stiffness discontinuities that are inherent therein. These stiffness discontinuities act as regions of high stress concentrations during blade impact. They occur in the abrupt transition areas between the stiff solid leading edge and the softer hollow sections 71–76 of the airfoil.

Referring to FIG. 4, the hollow fan blade 34 of the present invention also has a solid leading edge 50 and a solid trailing edge 52. A pressure surface 54 extends chordwise from the leading edge 50 to the trailing edge 52. The hollow fan blade 34 has spanwisely extending thickening ribs 66–70 disposed in the hollow cavity. Hollow cavities 71–76 are disposed between and defined by the spanwise stiffening ribs 66–70. The leading edge has a solid region of enhanced chordal thickness 78. In the pressure surface 54, this region of increased solidity 78 tapers 80 with decreased thickness in the chordwise direction from the leading edge towards the trailing edge.

In addition, the present invention has buttresses adjacent the trailing edge which provide for additional support. In the pressure side 54, there are two buttresses 82, 84 present (also shown in FIG. 5 and FIG. 6D). The buttress 82 is tapered with decreasing thickness in the chordwise direction from spanwise rib 70 toward spanwise rib 69. The buttress 84 has a height less than that of the spanwise ribs 66–70 but is uniform in height as it extends chordwisely from the spanwise rib 70 to the trailing edge 52. In the suction side 56, there are also two buttresses 86, 88 present (also shown in FIG. 7 and FIG. 8C). The buttress 86 is tapered with decreasing thickness in the chordwise direction from spanwise rib 70 toward spanwise rib 69. Buttress 88 tapers with decreasing thickness as it extends chordwisely from the spanwise rib 70 to the trailing edge 52. Buttresses 82, 84, 86, 88 each have expanded bases 94 (shown in FIG. 5 and FIG. 7) adjacent the pressure 54 or suction 56 surfaces of the airfoil respectively.

During operation of the gas turbine engine, due to loss of structural integrity in the root attachment 36 of the fan blades 34 to the hub 32, a blade loss condition may occur. This scenario is tested for as part of FAA certification requirements. The released blade travels across the fan blade passage with velocities of several hundred feet per second.

The primary impact of the released blade on a following blade occurs at the leading edge in a location approximately from fifteen percent (15%) to forty percent (40%) radially outward of the pressure side blade span. Due to the region of increased solidity 78 in the leading edge 50, approximately from fifteen percent (15%) to forty percent (40%) radially outward of the pressure side blade span, the blade withstands impact and no crack initiates. In addition, the chordwise taper 80 of the region of increased solidity 78 in this impact region provides a gradual transition from the region of solidity to the first hollow cavity 71. This further minimizes stress concentrations and geometric discontinuities between solid and hollow regions which propagate cracks.

Thus, the risk of following blade airfoil fracture is minimized after the primary impact with a released blade. Further, as the released blade moves centrifugally outward, the trailing edge of the released blade impacts the trailing edge of the following blade. This trailing edge impact occurs approximately from twenty percent (20%) to forty percent (40%) radially outward of the blade span. Due to the presence of buttresses 82, 84, 86, 88 in this location, no crack initiates in the airfoil as the buttresses have a larger surface area which absorbs and distributes any loads or stresses due to the secondary impact with the released blade. Further, the buttress 84 in the pressure side 54 hollow cavity 76 is constructed to be of uniform height as opposed to a taper of decreasing thickness. This buttress 84 has to withstand the stress and strain of the trailing edge impact and its uniform thickness protects against crack initiation and propagation. The additional support provided by all the buttresses allows for the impact energy to be distributed over a larger area as the buttresses have expanded thicknesses 94 adjacent the airfoil surfaces.

It should be noted that any disassociated fragments of the released blade and the released blade itself impact the fan containment case as they travel across the fan passage. The interaction with the containment case fractures the released blade into fragments which become entrapped within the engine, or which safely exit the engine via the fan duct.

A primary advantage of the present invention is that of durability. The present invention fan blade minimizes the risk of blade fracture of a following fan blade when a released blade impacts the following blade. A further advantage of the present invention is the decrease in the net weight of the engine. The hollow fan blades themselves increase in weight due to the strengthened areas such as the increased region of solidity and the buttresses. However, this increase in fan blade loss is more than offset by a decrease in the weight of associated engine structure needed to accommodate engine imbalance loads which would otherwise occur. The present invention reduces the fan blade out loads, in particular the rotor imbalance loads are reduced by about twenty-five percent (25%), by decreasing the release of blades during a blade loss condition. The loss of blades is responsible for imbalance loads at the rotor that get translated throughout the associated engine structure. By limiting the blade loss to the single released blade, the present invention requires less strengthening of the engine structure which has to withstand reduced imbalance loads. The associated structure includes the containment system, the engine rotor and casing, the rotor bearing structures, engine mounts and engine supporting structure including the wing and fuselage. Another advantage is the ease and cost of manufacturing blades with the aforementioned features. The impact resistant design is manufactured using the same manufacturing procedures and tools used for prior art blades. Thus, it is cost effective to manufacture an impact resistant airfoil.

Although the invention has been shown and described with respect to detailed embodiments thereof, it should be understood by those skilled in the art that various changes in form and detail thereof may be made without departing from the spirit and the scope of the claimed invention.

What is claimed is:

1. A hollow blade for an axial flow gas turbine engine disposed about a longitudinal axis, the gas turbine engine including an axial flow path defining a passage for working medium gases, said blade having a leading edge and a trailing edge extending radially spanwise from a root portion to a tip portion of said blade, said blade having a suction surface and a pressure surface extending chordwise from said leading edge to said trailing edge, said blade having a plurality of spanwise ribs and a plurality of hollow cavities disposed within the blade between said ribs, said hollow blade characterized by:

a region of increased solidity adjacent the leading edge and disposed outwardly from the radially inner end of said airfoil and extending to a location substantially inwardly from the tip, said region of said blade being disposed at predetermined locations corresponding to locations of impact of said blade with successive rotating fan blades thereby reducing the risk of blade fracture.

2. The hollow blade according to claim 1 further characterized by:

said region of increased solidity being disposed approximately from fifteen percent (15%) to forty percent (40%) radially outward from the root portion of the blade.

3. The hollow blade according to claim 2 having a first hollow cavity adjacent the leading edge further characterized by:

the region of increased solidity tapering with decreasing thickness in the chordwise direction from the leading to trailing edge thereby providing a gradual transition from the region of increased solidity to the first hollow cavity to minimize stress concentrations and geometric discontinuities thereat.

4. A hollow blade according to claim 1 further characterized by:

buttresses having an expanded thickness adjacent the pressure and suction surfaces, disposed adjacent the trailing edge and extending in the chordwise direction wherein the buttresses provide load absorption and distribution during an impact of said blade with successive rotating blades.

5. A hollow blade according to claim 4 further characterized by:

said buttresses tapering with decreasing thickness in the chordwise direction from the spanwise ribs to the trailing edge.

6. A hollow blade according to claim 4 further characterized by:

said buttresses being of uniform height and extending in the chordwise direction from the spanwise ribs to the trailing edge.

7. A hollow blade according to claim 4 further characterized by:

said buttresses located approximately from twenty percent (20%) to forty percent (40%) radially outward of the blade span.

8. A hollow blade for a fan in an axial flow gas turbine engine disposed about a longitudinal axis, the gas turbine engine including an axially directed flow path defining a passage for working medium gases, said blade having a leading edge and a trailing edge extending radially spanwise from a root portion to a tip portion of said blade, said blade having a suction surface and a pressure surface extending chordwise from said leading edge to said trailing edge, said blade having a plurality of spanwise ribs and a plurality of hollow cavities disposed within the blade, said hollow blade characterized by:

a region of increased solidity adjacent the leading edge and radially disposed approximately from fifteen percent (15%) to forty percent (40%) outward from the root portion of the blade, the region of increased solidity tapering with decreasing thickness in the chordwise direction from the leading edge to the trailing edge; and at least one buttress having an expanded thickness adjacent the pressure and suction surfaces, disposed adjacent the trailing edge and extending in the chordwise direction and located approximately from twenty percent (20%) to forty percent (40%) radially outward of the blade span, whereby risk of blade fracture due to impact of said blade with successive rotating fan blades is reduced by strengthened blade.

* * * * *